US006923296B1

(12) United States Patent
Mackiewicz et al.

(10) Patent No.: US 6,923,296 B1
(45) Date of Patent: Aug. 2, 2005

(54) DISC BRAKE

(75) Inventors: John Edmund Mackiewicz, Niles, MI (US); William John Penninger, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 29 days.

(21) Appl. No.: 10/708,466

(22) Filed: Mar. 5, 2004

(51) Int. Cl.[7] ............................................. F16D 55/14
(52) U.S. Cl. .................. 188/72.2; 188/73.46
(58) Field of Search ........................ 188/71.1–73.41, 188/196 BA, 196 V

(56) References Cited

U.S. PATENT DOCUMENTS

| | | | |
|---|---|---|---|
| 3,113,643 A | 12/1963 | Botterill | |
| 3,421,604 A | 1/1969 | Hobbs | |
| 3,442,356 A | 5/1969 | Hahm | |
| 3,722,636 A * | 3/1973 | Kobelt | ........................ 188/170 |
| 3,868,001 A | 2/1975 | Yokoi | |
| 3,912,051 A | 10/1975 | Yokoi | |
| 3,998,466 A | 12/1976 | Kondo | |
| 4,142,611 A * | 3/1979 | Johannesen | ................. 188/72.9 |
| 4,155,431 A * | 5/1979 | Johnson | ....................... 188/170 |
| 4,222,466 A * | 9/1980 | Brimaud | ...................... 188/76 |
| 4,530,423 A | 7/1985 | Ritsema | |
| 4,591,028 A * | 5/1986 | Hagiwara et al. | .......... 188/72.2 |
| 5,022,500 A | 6/1991 | Wang | |
| 5,499,705 A * | 3/1996 | Ide | .......................... 192/107 T |
| 5,660,253 A | 8/1997 | Rike | |
| 5,700,067 A | 12/1997 | Heubner | |
| 5,713,435 A | 2/1998 | Schneider et al. | |
| 5,845,747 A | 12/1998 | Rike | |
| 6,000,506 A | 12/1999 | Warwick | |
| 6,026,938 A | 2/2000 | Demoise | |
| 6,044,936 A | 4/2000 | Matsumoto | |
| 6,073,733 A | 6/2000 | Kapanowski | |
| 6,135,245 A | 10/2000 | Kurasako | |
| 6,308,806 B1 * | 10/2001 | Nielsen | .................... 188/24.11 |
| 6,334,514 B1 * | 1/2002 | Kirimoto et al. | ......... 188/73.41 |
| 6,340,077 B1 * | 1/2002 | Schaffer | ...................... 188/156 |
| 6,454,056 B1 | 9/2002 | Iida | |

* cited by examiner

*Primary Examiner*—Chris Schwartz
(74) *Attorney, Agent, or Firm*—Leo H McCormick, Jr.; Warren Comstock

(57) ABSTRACT

A support for a disc brake has first and second bores in a first projection and third and fourth bores in a second projection located in a same horizontal plane and the first and third bores aligned in a first vertical plane and the second and fourth bores aligned in a second vertical plane. A first pin retained in the first and third bores extend through a first lever to position a first friction member adjacent a rotor while a second pin extends through the second and fourth bores to position a second friction member adjacent the rotor. Pressurized fluid is supplied to act on a piston retained in the first lever such that the first lever pivots on the first pin and the second lever pivots on the second pin to thereafter move the first and second friction members into engagement with the rotor and effect a brake application.

7 Claims, 2 Drawing Sheets

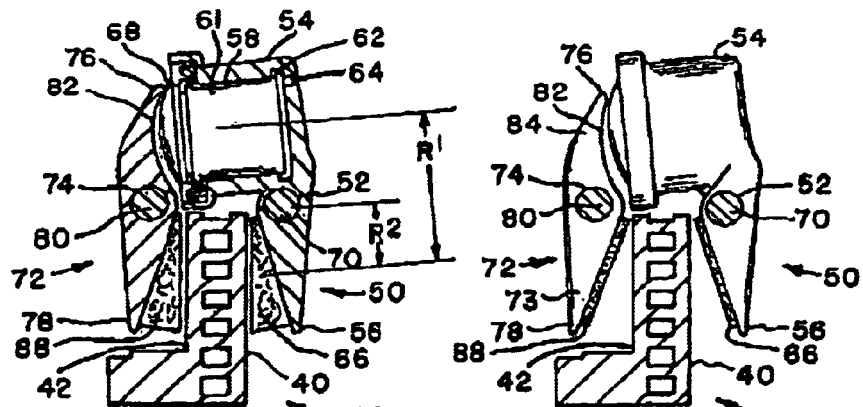
FIG. 4
FIG. 7
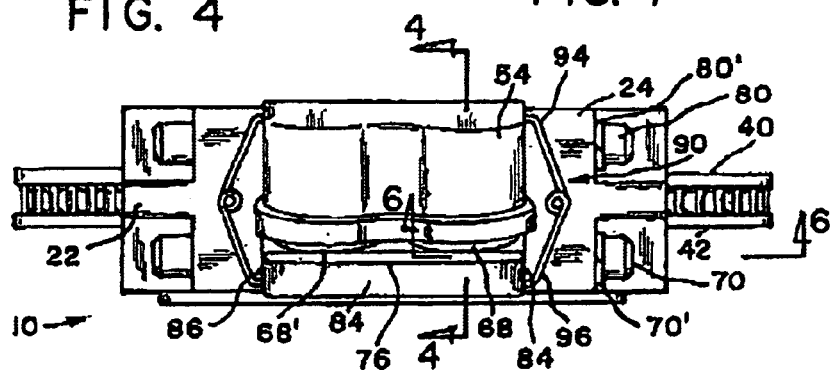
FIG. 3
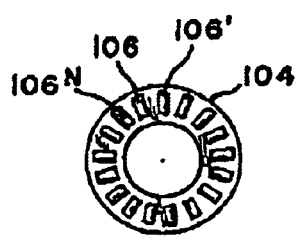
FIG. 5
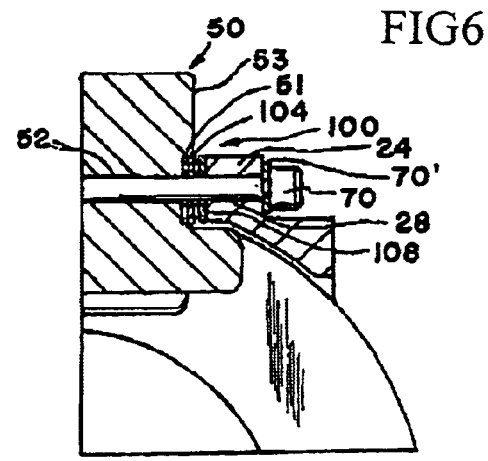
FIG 6

DISC BRAKE

BACKGROUND OF INVENTION

This invention relates to a disc brake having first and second levers that respectively pivot on pins to transmit an axial clamping force that moves first and second friction members into engagement with a rotor to effect a brake application.

In disc brakes, it is common for a caliper to straddle a rotor that is fixed to an axle of a vehicle with the caliper is fixed to a yoke that is secured to the housing of the vehicle. The caliper has a bore therein that retains an actuation piston to define an actuation chamber. A first friction member is connected to the actuation piston while a second friction member is connected to an arm that extends from the caliper. The first and second friction members are located on opposite sides of the rotor and when pressurized fluid is supplied to the actuation chamber, the piston and caliper move in opposite directions such that the first and second friction members engage the rotor to effect a brake application. The following U.S. Patents may be considered as illustrative of such disc brake and their corresponding functional operation: U.S. Pat. Nos. 3,113,643; 3,421,604; 3,442,356; 3,868,001; 3,912,051; 3,998,466; 4,530,423; 5,660,253; 5,700,067; 5,713,435; 5,826,681; 5,845,747; 6,000,506; 6,044,936; 6,073,733; 6,135,245 and 6,454,056. While all of the disc brakes disclosed by these patents have certain differences they function in a manner as describe above wherein the friction members and the caliper slide on either pins or rails during a brake application. Unfortunately such sliding can often results in high friction forces that must be overcome before and during the movement of the friction members into engagement with a rotor to effect a brake application.

It is understood that elimination or a reduction of the friction forces would allow that portion of an actuation force to be directed to the development of a brake force and as a result the size of a caliper and weight of a brake may be reduced.

SUMMARY OF INVENTION

The present invention provides a disc brake with an actuation arrangement whereby an input force applied to effect a brake application is transmitted through lever arms that pivot about pins to move first and second friction members into engagement with a rotor and thereby substantially eliminate hysteresis caused by sliding of brake pads on a rail or pin during a brake application.

In more particular detail, the disc brake is characterized by a support member that is fixed to a housing of a vehicle. The support member has a base with perpendicular first and second arms that extend therefrom. The first arm has a first perpendicular projection that extends therefrom while the second arm has a second perpendicular projection that extends therefrom to define symmetrical surfaces with respect to the base. The first perpendicular projection has first and second lateral bores that extends there through while the second perpendicular projection has third and fourth lateral bores that extends there through. The first and third bores are aligned in a first vertical plane with respect to the base while the second and fourth bores are alignment in a second vertical plane with respect to the base such that first, second, third and fourth bores are located in a same horizontal plane with respect to the base. A first lever has a lateral opening or bore that is located between a first end and a second end. The first lever has a bore adjacent the first end that receives a piston to define an actuation chamber that is selectively connected to a source of pressurized fluid while the second end retaining a first friction member. A first pin that is retained in the first and third bores extends through the lateral opening in the first lever to define a pivot point for the first lever and to position the first friction member adjacent a first face of a rotor. A second lever has a lateral opening located between a first end and a second end with the second end retaining a second friction member. A second pin that is retained in the second and fourth bores extends through lateral opening in the second lever to define a pivot point for the second lever and position the first end of thereof adjacent the piston and the second friction member adjacent a second face of the rotor. An actuation means is connected to selectively supply pressurized to the actuation chamber. The pressurized fluid acts on the piston and first lever causing the first lever to pivot about its pivot point and the second lever to pivot about its pivot point to correspondingly move the first and second friction members into engagement with the first and second faces of the rotor and effect a brake application.

An advantage of the disc brake resides in the pivoting of the levers about pins to impart an axial force that moves first and second friction members into engagement with a rotor to effect a brake application.

A further advantage of the invention is in the elimination of a need to slide a friction member into engagement with a rotor to effect a brake application.

BRIEF DESCRIPTION OF DRAWINGS

FIG. 3 is a top view of the disc brake of FIG. 1;

FIG. 4 is a partial sectional view of the disc brake taken along lines 4—4 of FIG. 3 in a rest position;

FIG. 5 is an enlarged sectional view showing a bearing arrangement for the levers of the disc brake of FIG. 1;

FIG. 6 is a sectional view taken along line 6—6 of FIG. 5; and

FIG. 7 is a partial sectional view of the disc brake of FIG. 4 showing the relationship of the friction members and rotor after a period use in a brake system.

DETAILED DESCRIPTION

In the specification where similar components are used the component may be identified by a number or a same number plus ' depending on a relationship with other components.

Figure 1:
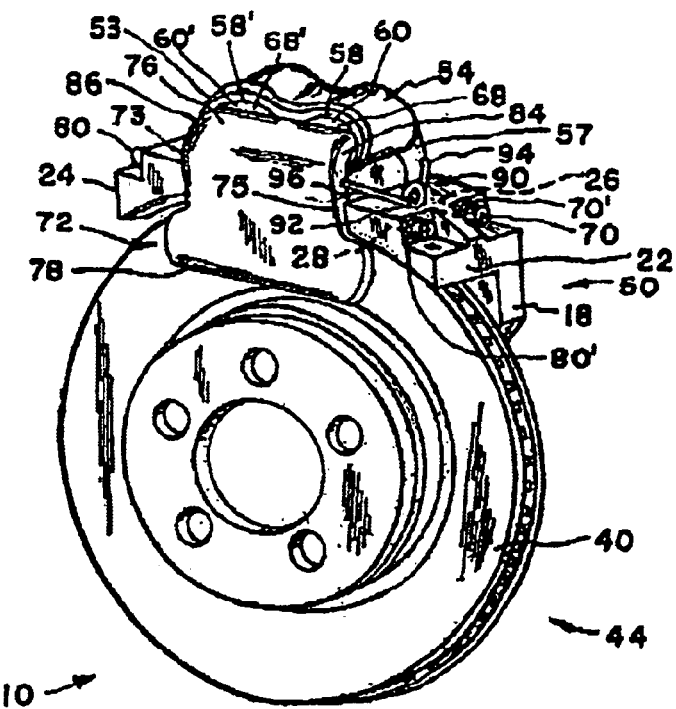
FIG. 1 is a front perspective view of a disc brake and rotor according to the present invention.
Figure 2:
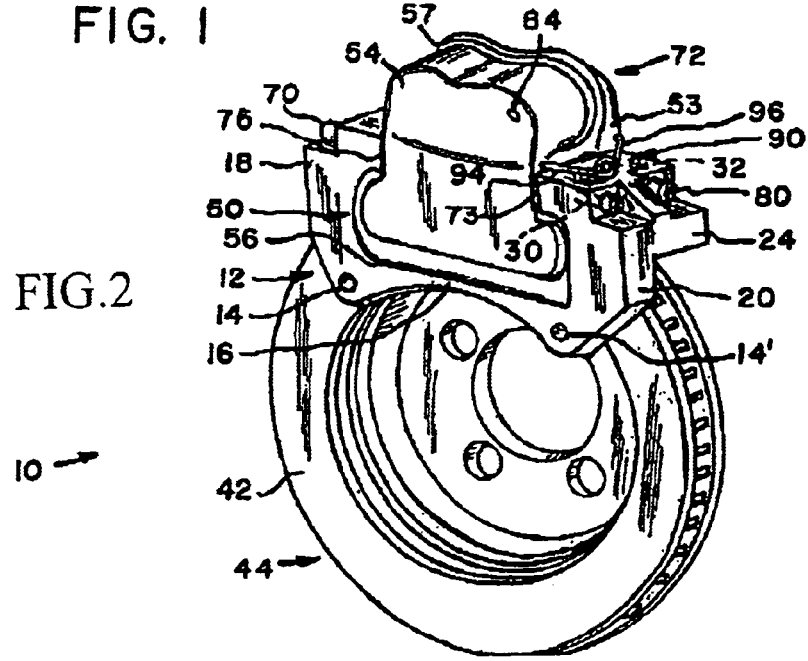
FIG. 2 is a rear perspective view of the disc brake of FIG. 1.

The disc brake 10 shown in FIGS. 1, 2 and 3 is made according to the present invention and has a torque member 12 that is fixed to a wheel or axle support for a vehicle by bolts that extend through openings 14,14' therein such that the torque member 12 transmits braking forces into the support during a brake application. Thus, the torque member 12 functions as a support for retaining the other components of disc brake 10 in a desired relationship with respect to a rotor 44 for that is associated with a wheel for a vehicle.

The torque member 12 is characterized by a base 16 that has perpendicular first 18 and second 20 arms that extend therefrom. The first arm 18 has a first perpendicular projection 22 that extends therefrom while the second arm 20 has a second perpendicular projection 24 that extends therefrom.

The first perpendicular projection 22 has first 26 and second 28 lateral bores that extends there through while the second perpendicular projection 24 has third 30 and fourth 32 lateral bores that extends there through. The first 26 and third 30 bores are aligned in a first vertical plane with respect to the base 16 while the second 28 and fourth 32 bores are alignment in a second vertical plane with respect to the base 16 such that the first 26, second 28, third 30 and fourth 32 bores are in a same horizontal plane with respect to the base 16. When the torque member 12 is fixed to the vehicle the first vertical plane is in parallel alignment adjacent a first face 40 while the second vertical plane is in parallel alignment adjacent a second face 42 of rotor 44. The torque member 12 defines a support for a first lever 50 and a second lever 72 through which an input force is applied to move friction member 66 and 88 into engagement with the faces 40 and 42 of the rotor to effect a brake application.

In more particular detail, the first lever 50 is defined with a first end 54 and a second end 56 having a first lateral opening 52 there between for receiving a pin 70 that is retained in the first bore 26 in the first projection and third bore 30 in the second 24 projection. Lever 50 is shown with first 58 and second 58' bores adjacent the first end 54 for retaining a first 60 and a second 60' pistons for compactness but a single bore and single piston is also envisioned by the invention while the second end 56 has a first friction member 66 attached thereto. The relationship of the first 60 and second 60' pistons within bores 58,58' is such that inlet port 64 that is connected to a source of pressurized fluid communicates to an actuation chamber 62 that is connected to both bores 58,58'. Pin 70 that extends through the first opening 52 and is retained in the first 26 and third 30 bores by snap rings 70' to define a first pivot point for lever 50 wherein the first friction member 66 is positioned in a parallel relationship with a face 42 on rotor 44 and the first 60 and second 60' pistons are positioned in a perpendicular relationship with rotor 44.

In order to provide for substantially free movement about the pivot point of lever 50, a bearing arrangement 100 is located in an arcuate groove 51 on each end of the lateral opening 52 for the first lever 50, as best illustrated in FIG. 6 and each end of the lateral opening 74 for the second lever 72. The bearing arrangement 100 are identical and defined by a needle bearing 104 that has a plurality of rollers 106, 106' ... 106ⁿ, see FIG. 5, that are located in an arc about a center axis and a spacer or washer 108. The arcuate groove 51 is located on face 53 adjacent the lateral opening 52 while arcuate groove 51' is located on face 57 adjacent lateral opening 52. The pin 70 extends through washer or spacer 108 and engages the needle bearing 104 of each of the bearing arrangements 100 such that a washer 108 and needle bearing 104 is located between face 53 and projection 22 and a washer and needle bearing are also located between face 57 and projection 24.

The first 60 and second 60' pistons are each characterized by a cylindrical body 61 with a dome 68, 68' that extends outside of bore 58,58'. The apex of the domes 68,68' are located at a first radial distance $R^1$ from the axis of the first lateral opening 52 while a mid-point of the first friction member 66 is located at a second radial distance $R^2$ from the axis of the first lateral opening 52. $R^1$ and $R^2$ are usually equal and as a result the pistons 60,60' and friction member 66 move a same arcuate distance about the axis of opening 52.

A second lever 72 is defined with a first end 76 and a second end 78 having a lateral opening 74 located there between for receiving a pin 80 that is retained in the second bore 28 in the first projection 22 and in the fourth bore 32 in the second 24 projection. The first end 76 is curved and defined by concave surface 82 that extends from a first side 84 to a second side 86 while the second end 78 has a second friction member 88 attached thereto. Pin 80 that extends through the lateral opening 74 is retained in the second 28 and fourth 32 bores by snap rings 80' to define a pivot point for lever 72 while positioning the second friction member 88 in a parallel relationship with a face 40 on rotor 44 and the curved surface 82 in a perpendicular relationship with pistons 60,60', as best illustrated in FIG. 4. The domes 68,68' engage the curved surface 82 such that a point contact is created between pistons 60,60' and the first end 76 of the second lever 72. As with lever 50, bearing arrangements 100 and 100' are located on sides 73 and 75 on lever 72 with respect the lateral opening 74 such that a needle bearing 104 and washer 106 are located between face 73 and projection 22 and face 75 and projection 24.

A first return spring 90 spring has a Y shape with the base 92 thereof attached to projection 22 and a first leg 94 attached to the first end 54 of lever 50 and a second leg 96 attached to the first end 76 of lever 72, see FIGS. 4 and 6. The return spring 90 acts on the levers 50 and 72 to respectively urge the first 66 and second 88 friction members away from face 42 and 40 of rotor 40 to prevent engagement there between in a rest position for piston 68 when pressurized fluid is not provided to the actuation chamber 62. If necessary, a second return spring 90' would be attached to projection 24 to assist in defining a running clearance between the first 66 and second 88 friction members away from face 42 and 40 of rotor 40.

Mode of Operation

When an operator desires to effect a brake application in a vehicle equipt with a disc brake 10, pressurized fluid is supplied to actuation chamber 62. The fluid in actuation chamber 62 acts on piston 60,60 creating a reaction force that causes the first lever 50 to pivot about pin 70 and the second lever 72 to pivot about pin 80 and move the first friction member 66 into engagement with face 42 and the second friction member 88 into engagement with face 40 on rotor 44 to effect a corresponding brake application.

On engagement of the first friction member 66 with face 42 and the second friction member 88 with face 40, an arcuate moment is created about the axis of the rotor 40 that is carried into pins 70 and 80 and depending on the direction of the rotation of the rotor into one of the first 22 or second 24 projections of torque member 12. As a result of pins 70 and 80 being supported at both ends, the moment is substantially carried into the projection as a lateral force and since bearing arrangements 100,100' are located between the levers 50 and 72, the pivoting is not effected by this transfer of this force into the torque member 12.

In disc brake 10, the first 66 and second 88 friction members will develop a wear pattern through engagement with faces 40 and 42 on rotor 44. The wear pattern is function of a distance that the friction member is from the pivot point on levers 50 and 72 and is substantially uniform from the first side to the second side. When the initial thickness of the friction members is reduced to about one-half the thickness of the pad would be of equal at both edges, see FIG. 7. In this arrangement a substantial dimensional change is not evident between a predominate leading edge and a trailing edge.

As the first 66 and second 88 friction members wear, the point contact between the domes 68,68' on pistons 60,60' and the curved surface 82 on the first end 76 of lever 72 proportionally shifts toward the pivot points of the levers 50 and 72. Because of the point contact, the entire input force is always directed in a perpendicular direction to rotate the levers 50 and 72 on pins 70 and 80 without the introduction of any side forces.

On termination of the communication of pressurize fluid to the actuation chamber 62, return springs 90,90' act on the first 50 and second 72 levers to bring the first ends 76 and 54 toward each other and at the same time move ends 78 and 56 away from each other such that a desired running clearance is produced between the first friction member 66 and face 40 and the second friction member 88 and face 42 of rotor 44.

What is claimed is:

1. A disc brake comprising:
   a support member fixed to an housing of a vehicle, said support member having a base with perpendicular first and second arms that extend therefrom, said first arm having a first perpendicular projection that extends therefrom and said second arm has a second perpendicular projection that extends therefrom, said first perpendicular projection having first and second lateral bores that extends there through while said second perpendicular projection has third and fourth lateral bores that extends there through, said first and third bores being aligned in a first vertical plane with respect to said base while said second and fourth bores are alignment in a second vertical plane with respect to said base such that said first, second, third and fourth bores are in a same horizontal plane with respect to said base;
   a first lever having a first opening located between a first end and a second end with a bore adjacent said first end, said bore retaining a piston to define an actuation chamber that is selectively connected to a source of pressurized fluid, said second end retaining a first friction member;
   a first pin retained in said first and third bores and extending through said first opening in said first lever to define a first pivot point for said first lever to position said first friction member adjacent a first face of a rotor;
   a second lever having a second opening located between a first end and a second end, said second end retaining a second friction member;
   a second pin retained in said second and fourth bores and extending through said second opening in said second lever to define a second pivot point for said second lever to position said first end of said second lever adjacent said piston and said second friction member adjacent a second face of said rotor;
   actuation means for supplying said actuation chamber with pressurized fluid that acts on said piston causing said first lever to pivot about said first pivot point and said second lever to pivot about said second pivot point and correspondingly move said first and second friction members into engagement with said first and second faces of said rotor to effect a brake application;
   a first bearing arrangement located in said first opening of said first lever and a second bearing arrangement located in said second opening of said second lever, said first pin engaging said first bearing arrangement and said second pin engaging said second bearing arrangement such that any arcuate moment created through the engagement of said first friction member with said first face and said second friction member with said second face is transmitted into said first and second pins without effecting the pivoting of said first arm on said first pin and second arm on said second pin; and
   a dome on said piston that provides for point contact with said first end of said second lever during the transmission of an input force into the second lover pivot to cause the second lever to pivot on said second pin and move said second friction member into contact with said second face of said rotor during a brake application, said first and second friction members each have a wear pattern that develops through engagement with said rotor and radially increases as a function of a distance that a friction member is from a pivot point.

2. The disc brake as recited in claim 1 wherein said first end of said second lever is characterized by curved surface that is mated with said dome of said piston to maintain said point contact during pivotal movement of said second lever about said second pin with changes in said wear pattern.

3. The disc brake as recited in claim 2 wherein said curved surface is characterized by a concave shape that mates with the dome of said piston to minimized the introduction of a resultant component from said input force into said second lever.

4. The disc brake as recited in claim 3 wherein said first lever is further characterized by a second bore that is parallel to said bore therein for retaining a second piston to define a second actuation chamber that is connected to said actuation chamber therein, said second piston having a dome shape on a end that engages said first end of second lever to provide a second actuation force to effect said brake application.

5. The disc brake as recited in claim 4 wherein the actuation force applied by said piston and said second actuation force applied by said second piston to said first end of said second lever are substantially of a same magnitude.

6. The disc brake as recited in claim 3 further including spring means attached to said support and said first and second levers for urging said first and second friction member away from said first and second faces on said rotor.

7. The disc brake as recited in claim 1 wherein said first and second pins restrain said first and second levers from acruate rotation and as a result said first and second friction members are also restrained from rotating about a radial plane such that a substantial uniform wear pattern occurs across the friction members during a brake application.

* * * * *